May 7, 1940.   C. KOVACH   2,200,091
VALVE FOR WATER FAUCET
Filed Jan. 27, 1939   2 Sheets-Sheet 1
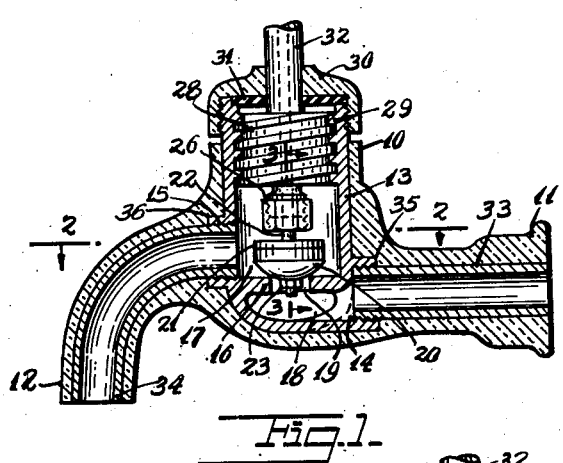
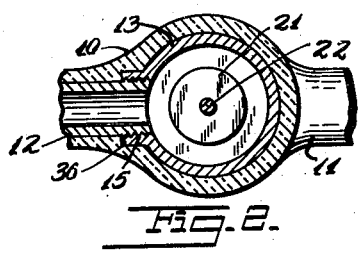
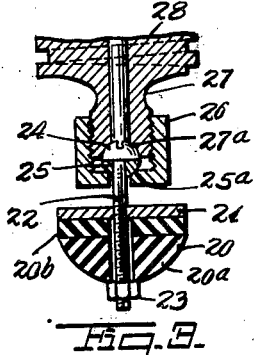
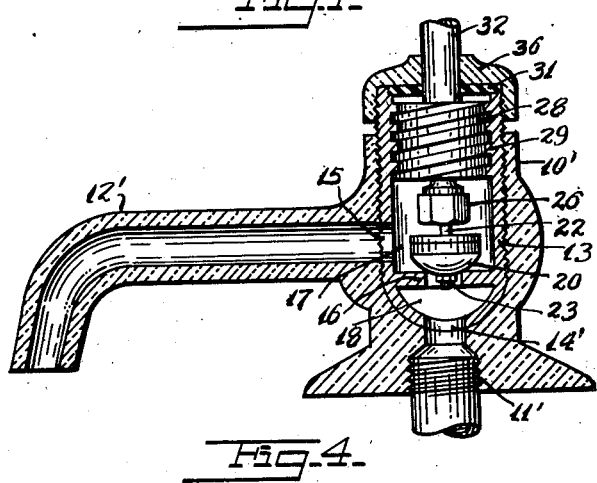
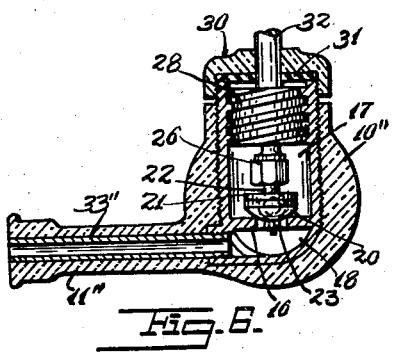
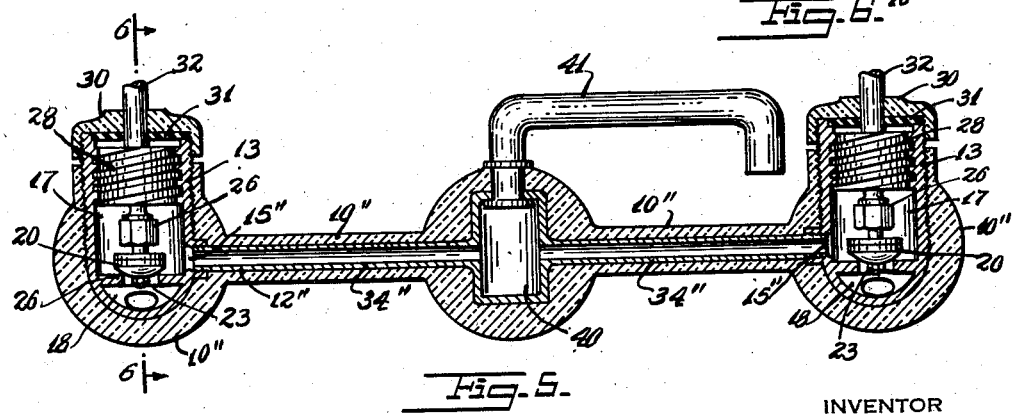
INVENTOR
Charles Kovach
BY
ATTORNEY May 7, 1940.  C. KOVACH  2,200,091
VALVE FOR WATER FAUCET
Filed Jan. 27, 1939  2 Sheets-Sheet 2

INVENTOR
*Charles Kovach*
BY
ATTORNEY

Patented May 7, 1940

2,200,091

UNITED STATES PATENT OFFICE 2,200,091

VALVE FOR WATER FAUCET

Charles Kovach, Perth Amboy, N. J.

Application January 27, 1939, Serial No. 253,085

1 Claim. (Cl. 251—27)

This invention relates to new and useful improvements in a water faucet.

The invention has for an object the construction of a water faucet which is characterized by an outer body of Bakelite or other phenol condensation material, or metal having a water inlet and an outlet, and a hollow cylindrical member arranged within said body and having openings connecting with said inlet and outlet and provided with a partition at right angles to its axis dividing off separate compartments selectively connecting with said opening. The invention contemplates arranging the partition with an opening, the edge of which forms a valve seat, and to provide a valve of novel construction cooperative with said seat to control the passage of water through the faucet.

The invention contemplates a varied construction of the outer body so that the device may comprise a standard water faucet having its inlet at its back, or a water faucet of the type having its water inlet at the bottom, or a water faucet of the hot and cold mixing type.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a fragmentary vertical sectional view of a water faucet embodying this invention.

Fig. 2 is a horizontal sectional view taken on the line 2—2 of Fig. 1.

Fig. 3 is a fragmentary vertical sectional view taken on the line 3—3 of Fig. 1.

Fig. 4 is a fragmentary vertical sectional view of another type of faucet embodying this invention.

Fig. 5 is a transverse vertical sectional view of still another type of faucet embodying the same invention.

Fig. 6 is a vertical sectional view taken on the line 6—6 of Fig. 5.

Figure 8:
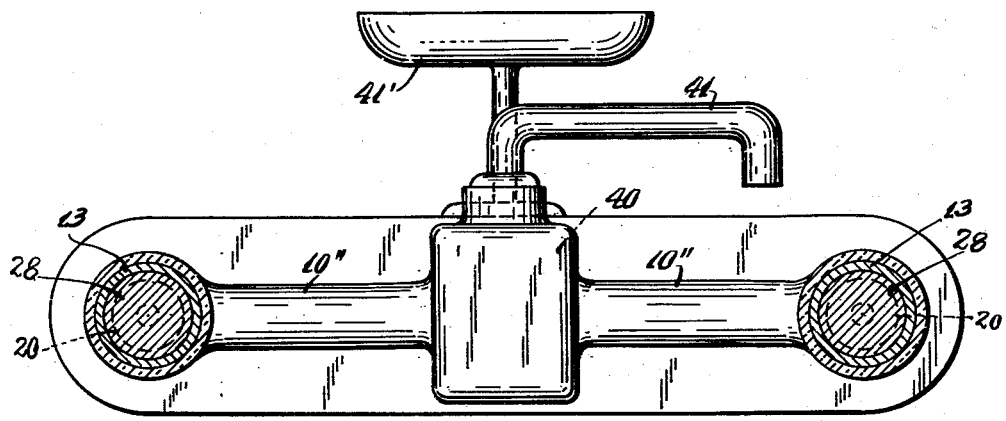
Fig. 8 is a vertical view, taken on the line 8—8 of Fig. 7.

The water faucet, according to this invention, includes an outer body 10 having a water inlet 11 and an outlet 12. A hollow cylindrical member 13 is mounted within the body 10 and has openings 14 and 15 connecting respectively with said inlet and outlet. The hollow member 10 is also provided with a partition 16 disposed at right angles to its axis and dividing off separate compartments 17 and 18 selectively connecting with the said openings 15 and 14.

The compartment 18 is itself formed with an opening 19 the edge of which forms a seat for a valve 20. The valve 20 consists of a bottom element 20$^a$ of semispherical form rested on a disc shaped washer 20$^b$ which in turn bears against a metallic disc 21. A bolt 22 has a threaded shank portion threadedly engaging the metallic disc 21 and this bolt extends through the parts 20$^b$ and 20$^a$. A nut 23 threadedly engages on the extended end of the bolt for clamping the valve elements tightly against the disc 21.

The bolt 22 has a round head 24. A washer 25 is engaged upon the bolt immediately below the head and this washer has a curved bottom face to substantially complete a sphere in conjunction with the round head 24. The head 24 and the washer are clamped by a cap 26. The bolt 22 engages axially through the cap 26. The cap 26 is threadedly mounted on a shank 27. The lower end of this shank is formed with a frusto spherical bearing surface 27$^a$ against which the head 24 engages. The inner face of the end of the cap 26 is also formed with a frusto spherical bearing surface 25$^a$ against which the curved face of the washer 25 engages.

The shank 27 is integral with a threaded stem 28 having a square thread and threadedly engaging a complementary thread 29 formed in the upper portion of the cylindrical member. A cap 30 threadedly engages on the outer face of the cylindrical member 13 at the top thereof. A washer 31 is set into the cap 30 and bears against the top edge of the cylindrical member 13. A stem 32 of a reduced diameter engages through the cap 30 and connects with the threaded section 28. This stem 30 is adapted to receive the regular handle for the faucet.

In this form of the invention the cap 30 and the outer body 12 preferably are made of Bakelite or some other composition material. In order to reinforce this material there is a tube 33 molded into the material of the body and connecting with the inlet opening 14. Another metallic tube 34 connects with the outlet opening 15 and is molded through the outlet portion of the body 12. The tubes 33 and 34 engage threaded bosses 35 and 36 at the inlet and outlet openings of the cylindrical member 13.

An important feature of this invention resides in the fact that the metal parts 13, 33 and 34 produce a relatively strong and sturdy framework for the water faucet, while the outer body may be made of relatively brittle material and may serve for decorative purposes. Moreover, the faucet may be constructed relatively cheap since the composition material may be had cheaper than brasses and bronzes now generally used in faucet construction. The metal portions of the faucet may be of relatively inexpensive metals.

Another important feature of the invention resides in the fact that the valve 20 is self-seating. Because of the spherical support of the bolt 22 it is possible for the valve 20 to move in all directions, something like a universal joint, and this action will insure the proper seating of the valve upon the valve seat. With this construction the threads 28 and the complementary threads 29 may be relatively coarse, and in general the construction of the valve be low priced, and yet the valve will be found to close perfectly and maintain a water tight connection.

In Fig. 4 a modified form of the invention is disclosed which distinguishes from the prior form merely in the construction of the outer body. In this form of the invention there is an outer body 12' of a design and shape so that it has its water inlet 11' at the bottom contrasted with the prior form where the inlet is at the back. In this form of the invention the inlet 11' connects with a water inlet 14' formed in the bottom of the hollow cylindrical member 13. This hollow cylindrical member is also provided with an outlet opening 15' which connects with the outlet portion 12' of the outer body. The outer body is generally indicated by the reference numeral 10'. It may be made of Bakelite or other composition material or of metal if so desired.

In Figs. 5 and 6 another modified form of the invention has been disclosed which distinguishes, essentially, from the prior forms in the shape of the outer body. In this form of the invention there is an outer body 10" of a type in which hot and cold water is adapted to be mixed. At each end of the body 10" there is a hollow cylindrical member 13 molded in the material thereof. At each end the hollow body 10' is provided with an inlet portion 11" and an outlet portion 12". These outlet portions connect with a central compartment 40 in which the hot and cold water mixes.

A discharge spout 41 is swivelly connected with the compartment 40. This compartment 40 preferably is in the form of a metallic hollow insert in the body 10" which may be of Bakelite or other composition material, molded or fitted on the interior partition. A metallic pipe 34" connects the discharge openings 15" with the compartment 40. Other metallic tubular inserts 33' are molded into the material of the body 10" and reinforces the water inlets to the body. In other respects this form of the invention is similar to the previous form.

Figure 7:
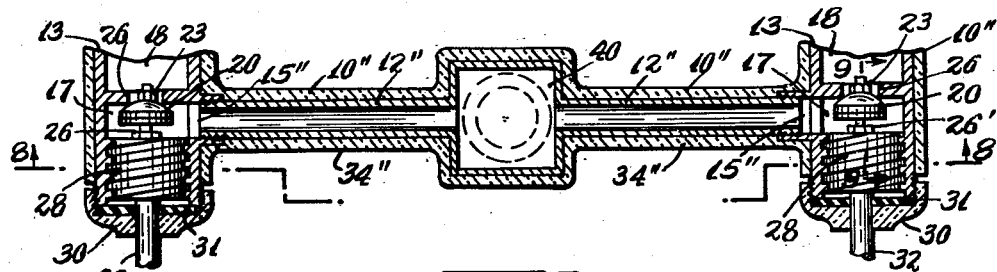
Fig. 7 is a similar view to Fig. 5, but illustrating another modification of the invention.
Figure 9:
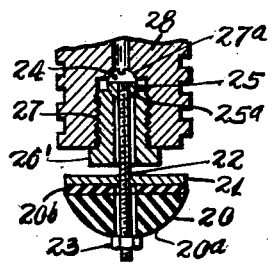
Fig. 9 is a fragmentary sectional view, taken on the line 9—9 of Fig. 7.

In Figs. 7, 8 and 9, the threaded plug 26' engages the internal thread 27 of stem 28. In other respects this form of the invention is similar to the previous form of the invention.

It is to be understood that the Bakelite or other composition covering may be entirely eliminated and the device may be made of brass, copper or of any other metal.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A valve engageable on a valve seat formed in a faucet body, comprising a valve stem adapted to be threadedly mounted in said body and having a top projecting end by which it may be turned, a valve body engageable upon said valve seat, a round headed bolt for supporting said valve body, a curved washer beneath said bolt head to form a spherical head in conjunction with said bolt head, and a cap mounted on the bottom of said valve stem for universally supporting said spherical head, said valve body comprising a metallic disc fixedly mounted on an intermediate portion of said bolt, a disc member on said bolt and engaging against said metallic disc, a resilient base member of semispherical form on said bolt and resting against said disc member and engageable against said valve seat, and a nut on said bolt engaging against the bottom of said base member for clamping said disc member and base member against said metallic disc as a unit.

CHARLES KOVACH.